3,062,609
PROCESS FOR DYEING WOOL WITH METAL COMPLEX DYESTUFFS

Heinz Abel, Reinach, Basel-Land, Switzerland, assignor to Ciba Limited, Basel, Switzerland
No Drawing. Filed Oct. 19, 1959, Ser. No. 847,051
Claims priority, application Switzerland Nov. 14, 1958
8 Claims. (Cl. 8—43)

This invention relates to the dyeing of wool with complex chromium or cobalt compounds of monoazo dyestuffs containing per atom of metal bound in complex union more than one molecule of monoazo dyestuff, the molecule of at least one dyestuff being free from sulfonic acid groups and carboxylic acid groups not participating in the complex formation. The novel and advantageous feature of the invention consists in the use of baths containing a wool immunizing agent having an affinity for the wool, and hexamethylene-tetramine, which baths have an acid reaction, at least at the beginning of the dyeing operation.

The heavy metal atom of the complexes to be used for the process of this invention may be bound to two molecules of the same or different dyestuffs. The complex-forming group of the dyestuffs may be for example, an ortho-hydroxy-ortho'-aminoazo grouping, an ortho-hydroxy-ortho'-carboxyazo grouping or preferably an ortho, ortho'-dihydroxyazo grouping. Numerous dyestuffs of the kind suitable for the present process have become known during the last few years.

In the process of this invention, the wool is dyed with such dyestuffs in the presence of a wool immunizing agent having an affinity for the fiber. Agents of this kind are compounds not having dyestuff character which to a greater or less extent transfer to the wool, at least when used alone and not in the presence of hexamethylene tetramine as in the present process. The chemical composition of the wool immunizing agents may vary within wide limits. Advantageously they contain an acid, salt-forming group, e.g. an HO—, HS— or $HO_3S$— group. The following are examples of the various kinds of compounds that can be used:

(a) Condensation products of alkylnaphthalene-sulfonic acid with benzoin;
(b) Thiophenols or phenols, rendered water-soluble by reaction with sulfides, sulfites or sulfite-form-aldehyde (e.g. the corresponding alkali metal or ammonium compounds) or by sulfonation;
(c) Condensation products of benzyl halides and naphthalene sulfonic acids;
(d) Tannin;
(e) Reaction products of formaldehyde and naphthalene sulfonic acids;
(f) Complex compounds of metals of the hydrogen sulfide group, [cf. Remy, "Treatise of Inorganic Chemistry," vol. I, p. 734 (1956)], such as antimony or preferably tin, and sulfurized phenols. The latter can be prepared by reacting a phenol with an alkali metal hydroxide, carbonate or sulfide or with an alkaline earth metal hydroxide or sulfide in the presence of sulfur;
(g) Sulfonated condensation products of hydroxyaryl compounds and formaldehyde, especially those obtained by condensing hydroxyaryl compounds of the benzene series, such as phenol or cresol with formaldehyde, sulfonating the product, and condensing the sulfonation product with formaldehyde.

Agents of this kind are known in large number; cf. Diserens, "Die neuesten Fortschritte in der Anwendung der Farbstoffe," vol. 2 (1949), pages 468 to 475, and 500 to 503; also British Patent No. 365,534.

At least at the beginning of the dyeing operation the dyebath must have an acid reaction. The latter is advantageously brought about by the addition of acetic acid. Since in the course of the dyeing process the hexamethylene tetramine gives off ammonia continuously, the pH value of the dyebath gradually rises, and so does that of the wool. It is easy, with the use of the quantities of acetic acid customarily used in dyeing from acid baths, to keep the pH value from rising substantially above 7 even in relatively long dyeing procedures and thus to avoid definitely any harm which the wool fiber might suffer from excessive alkalinity.

The quantity of the wool immunizing agent to be added to the dyebath may vary within wide limits. It may be, for example, 0.3 to 3% of the weight of the material to be dyed. The quantity of hexamethylene tetramine should be adapted to quantities of immunizing agent and acid used, although in this respect, variations within wide limits are possible with the process not only being still practicable, but giving favorable results.

In general, at least half a part and at most 5 parts of hexamethylene tetramine are used for each part of immunizing agent.

In other respects, the wool can be dyed in the usual manner. It may be loose, or in the form of slubbing yarn, skeins or piece goods. In the present process the wool fiber is not made resistant to the wool dyestuff, but there results a very considerable improvement of the level character of the dyeing and an excellent penetration of the dyed material.

Instead of adding the wool immunizing agent and the hexamethylene tetramine separately to the dyebath, these substances may be mixed with one another to form stable preparations which are suitable for use as such in practising the present process. Suitable proportions for such mixtures can be inferred from the data given above.

The following examples illustrate the invention. Unless otherwise stated, the parts and percentages are by weight, and the temperatures are shown in degrees centigrade.

Example 1

A preparation is made by mixing 1 part of a condensation product from naphthalene sulfonic acid and formaldehyde with 2 parts of hexamethylene tetramine. 100 parts of cross-wound wool are pre-treated for 15 minutes at 50° in a solution containing in 3000 parts of water 5 parts of acetic acid of 40 percent strength and 3 parts of the above preparation. There is then added an aqueous solution containing 0.5 part of the complex chromium compound (1:2 complex) of the dyestuff of the formula (1)
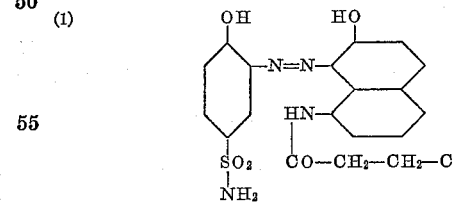
(gray)

after which the the whole is heated to the boil in the course of 30 minutes, and dyeing continued for 40 minutes at the boil. The wool is dyed more evenly and penetration is better than when the operation is performed without the above preparation.

Instead of the yarn, woolen piece goods may be dyed in this manner, e.g. pure wool gaberdine, in which case very level dyeings of good penetration are likewise obtained.

Instead of the aforementioned preparation there may be used one obtained from 2 parts of hexamethylene tetramine and 1 part of sulfurized phenol. The wool resisting agent and the hexamethylene tetramine may as well be added separately to the dyebath.

It is also possible to replace the afore-described preparations by one obtained from 2 parts of hexamethylene tetramine and 1 part of the complex tin compound of the sulfurized phenol, prepared as described in Example 2 of British Patent No. 365,534.

*Example 2*

A bath containing, in 3000 parts of water 100 parts of woolen piece goods, 5 parts of acetic acid of 40% strength, and 3 parts of a preparation as described in the first or last paragraph of Example 1, is heated to the boiling temperature, heating then interrupted temporarily, and an aqueous solution of 3 parts of the complex cobalt compound (1:2-complex) of the dyestuff of the formula (2) 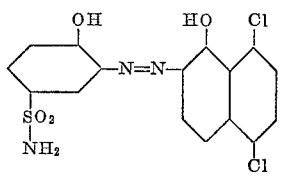

added, after which the bath is kept boiling for 30 minutes. There is obtained a level bordeaux dyeing of good penetration.

Instead of the above complex cobalt compound there may be used any of the following complex metal compounds: The 1:2-cobalt complex of the dyestuff of the formula:

(3) 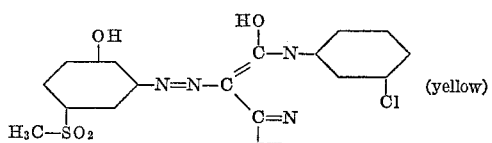 (yellow)

the 1:2-chromium complex of the dyestuffs of the formula (4) 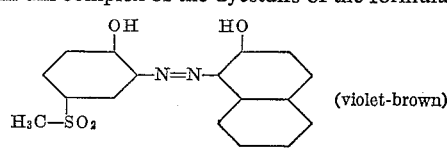 (violet-brown)

the 1:2-chromium complex of the dyestuff of the formula (5) 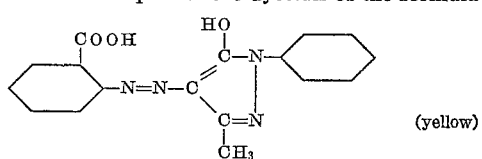 (yellow)

the 1:2-cobalt complex of the dyestuff of the formula (6) 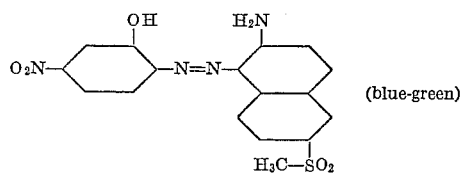 (blue-green)

the 1:2 cobalt complex of the dyestuff of the formula (7) 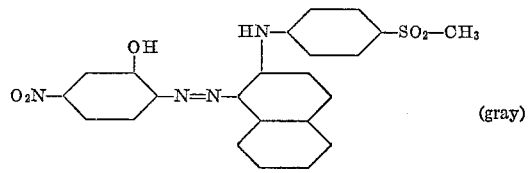 (gray)

the 1:2 cobalt complex of the dyestuff of the formula (8) 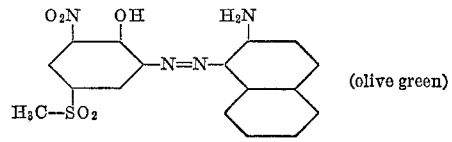 (olive green)

*Example 3*

Level wool dyeings of good penetration are also obtained when in the procedure of Example 1 or 2 the preparation mentioned is replaced by one containing for 2 parts of hexamethylene tetramine 1 part of the product mentioned under (1) below, or of one obtained as shown under (2) to (6) below.
(1) Tannin.
(2) The condensation product of trichlorobenzyl chloride and 2-hydroxynaphthalene is sulfonated and neutralized with sodium hydroxide solution.
(3) A mixture of phenol and para-cresol is reacted with formaldehyde, the product sulfonated and reacted with formaldehyde again, then neutralized with ammonia.
(4) A mixture of 2 mols of phenol and 1 mol of para-octylphenol is condensed with 1.76 mols of formaldehyde, the reaction product sulfonated, the sulfonic acid reacted with formaldehyde, and finally neutralized with ammonia.
(5) A mixture of 2 mols of salicylic acid and 1 mol of octylphenol is reacted in the manner shown under (4).
(6) A mixture of 2 mols of phenol and 1 mol of dodecylphenol is reacted in the manner shown under (4).

*Example 4*

A preparation is made by mixing 2 parts of hexamethylene tetramine with 1 part of the complex tin compound of sulfurized phenol, prepared as described in Example 2 of British Patent No. 365,534. 100 parts of woollen piece goods are entered into a bath containing 3 parts of said preparation and 5 parts of acetic acid of 40% strength, the bath is heated to the boiling temperature, heating is then interrupted temporarily and there is added an aqueous solution containing 0.2 part of the chromium compound in which one molecule of the dystuff of the formula (9) 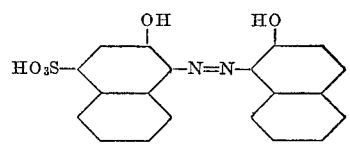

and one molecule of the dyestuff of the formula

(10) 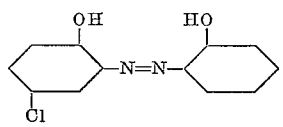

are bound in complex union with 1 atom of chromium. After the addition of the dyestuff the bath is kept boiling for 30 minutes. A level bluish-gray dyeing of good penetration is obtained.

What is claimed is:
1. Process for dyeing wool with complex compounds containing per atom of a metal selected from the group consisting of chromium and cobalt more than one molecule of monoazo dyestuff, the molecule of at least one monoazo dyestuff being free from sulfonic acid groups and carboxylic acid groups not participating in the complex formation, which process comprises applying the dyestuff from a dyebath which contains a wool immunizing agent selected from the group consisting of
  (a) a complex tin-sulfurized phenol compound,
  (b) a reaction product of formaldehyde and naphthalene sulfonic acid
  (c) tannin, and
  (d) a product obtained by reaction of a phenol with formaldehyde, subsequent sulfonation and again reaction of the resulting sulfonic acid with formaldehyde, and also contains hexamethylene-tetramine and which has an acid reaction at least at the beginning of the dying operation, the maximal acidity of the dyebath attained during the whole dyeing operation being that of dilute acetic acid.

2. Process for dyeing wool with complex compounds containing per atom of a metal selected from the group consisting of chromium and cobalt more than one molecule of monoazo dyestuff, the molecule of at least one monoazo dyestuff being free from sulfonic acid groups and carboxylic acid groups not participating in the complex formation, which process comprises applying the dyestuff from a dyebath which contains a complex tin-sulfurized phenol compound and also contains hexamethylene-tetramine and has an acid reaction at least at the beginning of the dyeing operation, the maximal acidity of the dyebath attained during the entire dyeing operation being that of dilute acetic acid.

3. Process for dyeing wool with complex compounds containing per atom of a metal selected from the group consisting of chromium and cobalt more than one molecule of monoazo dyestuff, the molecule of at least one monoazo dyestuff being free from sulfonic acid groups and carboxylic acid groups not participating in the complex formation, which process comprises applying the dyestuff from a dyebath which contains a complex tin-sulfurized phenol compound and also contains hexamethylene-tetramine and has been rendered acid with acetic acid at the beginning of the dyeing operation, the maximal acidity of the dyebath attained during the entire dyeing operation being that of dilute acetic acid.

4. Process for dyeing wool with complex compounds containing per atom of a metal selected from the group consisting of chromium and cobalt more than one molecule of monoazo dyestuff, the molecule of at least one monoazo dyestuff being free from sulfonic acid groups and carboxylic acid groups not participating in the complex formation, which process comprises applying the dyestuff from a dyebath which contains a reaction product of formaldehyde and naphthalene sulfonic acid and also contains hexamethylene-tetramine and has an acid reaction at least at the beginning of the dyeing operation, the maximal acidity of the dyebath attained during the entire dyeing operation being that of dilute acetic acid.

5. Process for dyeing wool with complex compounds containing per atom of a metal selected from the group consisting of chromium and cobalt more than one molecule of monoazo dyestuff, the molecule of at least one monoazo dyestuff being free from sulfonic acid groups and carboxylic acid groups not participating in the complex formation, which process comprises applying the dyestuff from a dyebath which contains a reaction product of formaldehyde and naphthalene sulfonic acid and also contains hexamethylene-tetramine and has been rendered acid with acetic acid at the beginning of the dyeing operation, the maximal acidity of the dyebath attained during the entire dyeing operation being that of dilute acetic acid.

6. A stable preparation suitable as an assistant for dyeing wool with complex compounds containing per atom of a metal selected from the group consisting of chromium and cobalt more than one molecule of monoazo dyestuff, the molecule of at least one monoazo dyestuff being free from sulfonic acid groups and carboxylic acid groups not participating in the complex formation, which preparation consists essentially of
(I) a wool immunizing agent selected from the group consisting of
   (a) a complex tin-sulfurized phenol compound,
   (b) a reaction product of formaldehyde and naphthalene sulfonic acid
   (c) tannin, and
   (d) a product obtained by reaction of a phenol with formaldehyde, subsequent sulfonation and again reaction of the resulting sulfonic acid with formaldehyde, and
(II) hexamethylene tetramine.

7. A stable preparation suitable as an assistant for dyeing wool with complex compounds containing per atom of a metal selected from the group consisting of chromium and cobalt more than one molecule of monoazo dyestuff, the molecule of at least one monoazo dyestuff being free from sulfonic acid groups and carboxylic acid groups not participating in the complex formation, which preparation consists essentially of a sulfurized phenol compound and hexamethylene-tetramine.

8. A stable preparation suitable as an assistant for dyeing wool with complex compounds containing per atom of a metal selected from the group consisting of chromium and cobalt more than one molecule of monoazo dyestuff, the molecule of at least one monoazo dyestuff being free from sulfonic acid groups and carboxlyic acid groups not participating in the complex formation, which preparation consists essentially of
(a) a complex tin-sulfurized phenol compound, and
(b) hexamethylene tetramine.

References Cited in the file of this patent

UNITED STATES PATENTS

| 2,422,586 | Royer et al. | June 17, 1947 |
| 2,903,324 | Hirsbrunner | Sept. 8, 1959 |

OTHER REFERENCES

Diserens, "Chemical Technology of Dyeing and Printing," vol. 2, 1951, Reinhold Publishing Corp. N.Y., pp. 329–333.